United States Patent [19]

Sparapany et al.

[11] Patent Number: 5,938,937
[45] Date of Patent: *Aug. 17, 1999

[54] HYDROPHILIC DISPERSION POLYMERS FOR TREATING WASTEWATER

[75] Inventors: John W. Sparapany, Bolingbrook; John R. Hurlock, Hickory Hills, both of Ill.

[73] Assignee: Nalco Chemical Company, Naperville, Ill.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/515,770

[22] Filed: Aug. 16, 1995

[51] Int. Cl.$^6$ ........................................ C02F 1/56
[52] U.S. Cl. ...................... 210/728; 210/734; 210/928
[58] Field of Search ..................... 210/725, 727, 210/728, 734, 735, 928

[56] References Cited

U.S. PATENT DOCUMENTS

| | | | |
|---|---|---|---|
| 3,647,769 | 3/1972 | Bufton et al. | 260/85.5 |
| 4,391,932 | 7/1983 | Tai | 523/337 |
| 4,396,513 | 8/1983 | Haldeman | 210/734 |
| 4,929,655 | 5/1990 | Takeda et al. | 524/458 |
| 5,006,590 | 4/1991 | Takeda et al. | 524/458 |
| 5,137,641 | 8/1992 | Bhattacharyya et al. | 210/734 |
| 5,330,650 | 7/1994 | Byrne et al. | 210/708 |
| 5,435,922 | 7/1995 | Ramesh et al. | 210/734 |
| 5,451,326 | 9/1995 | Carlson et al. | 210/734 |
| 5,587,415 | 12/1996 | Takeda | 210/734 |
| 5,614,602 | 3/1997 | Conners et al. | 526/287 |
| 5,750,034 | 5/1998 | Wong Shing et al. | 210/705 |
| 5,792,366 | 8/1998 | Coville | 210/734 |

*Primary Examiner*—Peter A. Hruskoci
*Attorney, Agent, or Firm*—Michael B. Martin; Thomas M. Breininger

[57] ABSTRACT

Hydrophilic cationic copolymers of acrylamide are prepared as dispersions in a salt media. These polymers have high molecular weights and are readily soluble by diluting in water. These polymers are useful flocculants for such applications as sludge dewatering, raw water clarification aids, emulsion breakers and waste water clarification aids.

10 Claims, No Drawings

HYDROPHILIC DISPERSION POLYMERS FOR TREATING WASTEWATER

BACKGROUND OF THE INVENTION

1. Field of the Invention

The invention relates to the field of waste water treatment with hydrophilic dispersion polymers.

2. Description of the Prior Art

Water soluble copolymers of acrylamide and cationic monomers such as dimethylaminoethylacrylate methyl chloride quaternary salts are well known in the literature. U.S. Pat. No. 3,647,769 teaches the formation of a copolymer of acrylamide and acrylonitirile followed by reaction with amines. Polymers of this type have high molecular weights, high viscosities in water and are hydrophilic. However, to ship such aqueous polymers in commerce, very dilute solutions would be required which is impractical. Preparation of inverse latex polymers or water-in-oil emulsions is described in U.S. Pat. No. 4,391,932. The inverse latex product is an oil continuous phase with water soluble polymer particles dispersed within the oil by emulsifiers. Activation of these polymers can require sophisticated equipment and often the polymer particles are not completely solubilized.

Water dispersions polymers described as water soluble co- and terpolymers containing a hydrophobic moiety are described in U.S. Pat. No. 5,006,590 and U.S. Pat. No. 4,929,655, assigned to Kyoritsu Yuki Co., Ltd., Tokyo, Japan. Disclosures of these patents are incorporated herein. These polymers are prepared in a water continuous phase containing salts and in some cases low molecular weight cationic polymeric dispersants. The polymers are diluted in water for activation. In these polymers the hydrophobic moiety prevent the polymer from fully solubilizing and reaching full activity. According to those inventions, the polymer dispersion is prepared from a water-soluble monomer mixture containing at least 5 mole percent of a cationic monomer represented by the general formula (I):

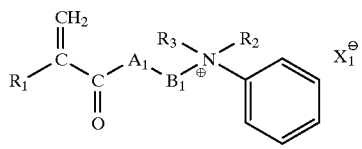

where $R_1$ is H or $CH_3$; $R_2$ and $R_3$ are each an alkyl group having 1 or 2 carbons atoms; $A_1$ is an oxygen atom or NH; $B_1$ is an alkyl group and $X_1$ is a counter anion such as chloride or bromide.

SUMMARY OF THE INVENTION

This invention relates to the unexpected formation of dispersions of hydrophilic cationic copolymers of acrylamide in a salt media. The polymers of the invention are cationic high molecular weight hydrophilic dispersions of polymer in a water continuous phase. Diluting the polymer product into water results in solubilizing the dispersion polymers thereby preparing the polymers for use. These polymers have been found to be particularly effective for removing solids and oils from waste waters. The preferred chemistry is acrylamide with dimethylaminoethylacrylate methyl chloride or methyl sulfate quaternary monomers.

DESCRIPTION OF THE PREFERRED EMBODIMENTS

These polymers were found to form stable dispersions and readily solubilize upon dilution in water. Because there are no hydrophobic moieties on the polymer, the sludge conditioning activities were significantly better than the dispersion polymers prepared with hydrophobic moieties. The cationic copolymers of this invention comprise copolymers of acrylamide and dimethylaminoethylacrylate methyl chloride quaternary salt (DMAEA.MCQ) and dimethylaminoethylmethacrylate methyl chloride quaternary salt (DMAEM.MCQ).

The term "dimethylaminoethylacrylate" as used herein includes dimethylaminoethylacrylate, dimethylaminoethylmethacrylate and mixtures thereof.

The term "quaternary salt" as used herein contemplates the use of any conventional quaternizing agent, as for example, methyl chloride, methyl bromide, methyl iodide and dimethyl sulfate.

The polymers of this invention are prepared as hydrophilic copolymers of acrylamide and dimethylaminoethylacrylate methyl chloride quaternary salt in a salt media containing a low molecular weight cationic dispersant polymer. Chain transfer agents include sodium formate, isopropanol and 2-mercaptoethanol, and the like.

The polymers of this invention are useful as retention aids in the manufacture of paper, as dewatering aids for municipal and industrial waste materials and as raw water clarification aids.

The hydrophilic dispersion polymer of the invention is prepared by polymerization of acrylamide with DMAEA.MCQ or DMAEM.MCQ in a water/salt media. The polyvalent anionic salt in the aqueous solution is suitably a sulfate, phosphate or mixture thereof. Preferable salts include ammonium sulfate, sodium sulfate, ammonium hydrogenphosphate and the like. In the present invention these salts may be each used as an aqueous solution thereof having a concentration of 15 percent or greater.

A dispersant polymer is present in the aqueous salt solution where the polymerization of the monomers occurs. The dispersant polymer is a water-soluble cationic polymer which is soluble in the above described salt media. The dispersant polymer is used in an amount of from 1 to 10 percent by weight based on the total weight of monomers. The dispersant polymer is composed of preferably 20 mole percent or more of cationic units such as DMAEA.MCQ, DMAEM.MCQ and diallyidimethylammonium chloride (DADMAC). The remainder of the dispersant mole percent composition is preferably acrylamide or methacrylamide. Molecular weight of the dispersant is preferably between 10,000 and 10,000,000. A multifunctional alcohol is present during the polymerization. Such alcohol's are glycerin and polyethyleneglycol. The formation of the dispersion particles are smoothly carried out in the presence of these alcohols. These alcohols are also believed to control the resulting molecular weight of the polymer. Further control of the molecular weight can be accomplished by using chain transfer agents such as sodium formate and isopropanol.

For the polymerizations, a usual water-soluble radical-forming agent can be used, but preferably water-soluble azo compounds such as 2,2'-azobis(2amidinopropane) hydrochloride and 2,2'-azobis(N,N'-dimethyleneisobutylamine) hydrochloride are used.

The polymerization process can be carried out as a batch process or in steps. In a batch process, all of the reactive monomers are reacted together, whereas in a step or semi-batch process, a portion of the reactive monomer is with held from the main reaction and added over time to affect the compositional drift of the copolymer and the formation of the dispersion particles. Typically, DMAEM.MCQ chemistry must be polymerized in a semi-batch process to afford a more random copolymer. To those skilled in the art, a more random copolymer of cationic and nonionic monomers performs better in the desired application of the polymer. Seed polymer can also be used to aid in the formation of the dispersion particles. The seed polymer is a water soluble dispersion polymer which is insoluble in the salt media. The composition of the seed polymer need not be similar to the composition being formed.

The following examples are presented to describe the preferred embodiments and utilities of the invention and are not meant to limit the invention unless otherwise stated in the claims.

EXAMPLE 1

To a two-liter resin reactor equipped with stirrer, temperature controller, and water cooled condenser, was added 171.62 grams of a 49.2% solution of acrylamide (1.1879 moles), 17.05 grams of a 75.0% solution DMAEA.MCQ (0.06602 moles), 220 grams of ammonium sulfate, 20 grams of sodium sulfate, 253.83 grams of deionized water, 12.0 grams of glycerol, 33.75 grams of a 16% solution of polyDADMAC (IV=1.3 dl/gm), 45 grams of a 20% solution of polyDMAEA.MCQ (IV=2.0 dl/gm), and 0.2 grams of EDTA. The mixture was heated to 48° C. and 0.50 grams of a 4% solution of 2,2'Azobis(2 amidinopropane) dihydrochloride was added. The resulting solution was sparged with 1000 cc/min. of nitrogen. After 15 minutes, polymerization began and the solution became viscous. Over the next 4 hours the temperature was maintained at 48° C. and a solution containing 140.42 grams of 49.2% acrylamide, (0.9720 moles), 44.93 grams (0.1740 moles) of a 75.0% solution of DMAEA.MCQ, and 0.2 grams of EDTA was pumped into the reactor using a syringe pump. To the resulting polymer dispersion was added 0.50 grams of a 4% solution of 2,2; Azobis(2 amidinopropane) dihydrochloride. The dispersion was then further reacted for 2.5 hours at a temperature of 48° to 55° C. The resulting polymer dispersion had a Brookfield viscosity of 9100 cps. To the above dispersion was added 10 grams of 99% adipic acid and 30 grams of ammonium sulfate, and 20 grams of sodium sulfate. The resulting dispersion polymer had a Brookfield viscosity of 880 cps and contained 20% of an 90/10 copolymer of acrylamide and DMAEA.MCQ with an intrinsic viscosity of 18.2 dl/gm in 0.125 molar NaNO$_3$. Hydrophilic and hydrophobic dispersion polymers made by this method are presented in Tables I and II.

TABLE 1

Hydrophilic Dispersion Polymers

| Polymer Number | Cationic Charge (Mole) | Cationic Chemistry | Percent Polymer Actives | RSV (dl/gm) |
|---|---|---|---|---|
| A | 1 | DMAEA.MCQ | 20 | 15.8 |
| B | 1 | DMAEA.MCQ | 20 | 16.6 |
| C | 3 | DMAEA.MCQ | 20 | 19.2 |
| D | 5 | DMAEA.MCQ | 20 | 15.2 |
| E | 10 | DMAEA.MCQ | 20 | 15.5 |
| F | 20 | DMAEA.MCQ | 20 | 15.2 |
| G | 20 | DMAEA.MCQ | 20 | 21.9 |
| H | 20 | DMAEA.MCQ | 20 | 19.3 |

TABLE 1-continued

Hydrophilic Dispersion Polymers

| Polymer Number | Cationic Charge (Mole) | Cationic Chemistry | Percent Polymer Actives | RSV (dl/gm) |
|---|---|---|---|---|
| I | 34 | DMAEA.MCQ | 20 | 19.7 |
| J | 34 | DMAEA.MCQ | 20 | 20.6 |

TABLE II

Hydrophilic Dispersion Polymers

| Polymer Number | Cationic Charge (Mole) | Cationic Chemistry | Percent Polymer Actives | RSV (dl/gm) |
|---|---|---|---|---|
| K | 1 | DMAEA.BCQ | 20 | 13.6 |
| L | 1 | DMAEA.BCQ | 20 | 12.2 |
| M | 3 | DMAEA.BCQ | 20 | 15.5 |
| N | 3 | DMAEA.BCQ | 20 | 12 |
| O | 3 | DMAEA.BCQ | 20 | 11.7 |
| P | 5 | DMAEA.BCQ | 20 | 10.6 |
| Q | 5 | DMAEA.BCQ | 20 | 13.7 |
| R | 5 | DMAEA.BCQ | 20 | 11.4 |

EXAMPLE 2

Additional Polymers/Activity Testing

Activity Testing

Performance of the polymers can be measured using bench test methods to obtain a relative performance comparison. The gravity drainage test was used to determine the sludge conditioning activity of the flocculants listed in Tables I, II and III.

TABLE III

Standard Cationic Inverse Latex Polymers

| Polymer Number | Cationic Charge (Mole) | Cationic Chemistry | Percent Polymer Actives | RSV (dl/gm) |
|---|---|---|---|---|
| Std 1 | 1 | DMAEA.MCQ | 26 | 25 to 30 |
| Std 2 | 3 | DMAEA.MCQ | 26 | 25 to 30 |
| Std 3 | 5 | DMAEA.MCQ | 28 | 21 to 30 |
| Std 4 | 20 | DMAEA.MCQ | 35 | 11 to 16 |
| Std 5 | 34 | DMAEA.MCQ | 35 | 10 to 16 |

The gravity bench test was run by adding an aliquot of the activated polymer solution to a sample of sludge (200 ml) and mixing with sufficient energy to cause effective flocculation of the sludge particles. The mixture was then poured onto a filter and the amount of free water drained for a specific time was recorded. Drainage volumes were recorded at a 10 second drainage time. The activity of the polymers can be evaluated in terms of efficiency and effectiveness. Efficiency is defined as the lowest polymer dosage which significant water drainage occurred while effectiveness, refers to the maximum water drained at a specific dosage.

PERFORMANCE TEST SUMMARY

Activity of the polymers was measured using paper mill sludges and municipal sludges. These sludges are typical and exemplify the performance of the polymers and are not meant to limit the invention.

In Paper Mill No. 1, the sludge tested was an 80:20 ratio of primary:secondary sludge (Table IV).

TABLE IV

Paper Mill No. 1 80:20 Ratio; Primary:Secondary Sludge
Water Drainage (ml) From Polymer Treatment of Sludge

| Equal Actives Dosage(ml): Polymer Tested | 1.00 | 2.00 | 3.00 | 4.00 | 5.00 | 7.00 |
|---|---|---|---|---|---|---|
| | | | Water Drainage(ml) | | | |
| Std 1 | | | 70.00 | | 70.00 | 62.00 |
| A (DMAEA.MCQ) | | 70.00 | 85.00 | 83.00 | 78.00 | |
| B (DMAEA.MCQ) | | 76.00 | | 80.00 | | 82.00 |
| Std 2 | | 70.00 | 95.00 | | 102.00 | 100.00 |
| C (DMAEA.MCQ) | | 80.00 | 95.00 | | 98.00 | 105.00 |
| M (DMAEA.BCQ) | | 70.00 | 84.00 | | 100.00 | 102.00 |
| Std 3 | | 68.00 | 96.00 | | 102.00 | 100.00 |
| D (DMAEA.MCQ) | 50.00 | 82.00 | 100.00 | | 110.00 | |
| E (DMAEA.MCQ) | | 75.00 | 95.00 | | 100.00 | 100.00 |
| Q (DMAEA.BCQ) | | 58.00 | 80.00 | | 100.00 | |

The performance of the dispersion polymers of this invention were compared to a inverse latex standard polymer of equivalent cationic charge and where possible to the hydrophobic dispersion polymer with the same cationic charge. In this test sludge, Polymers A, C, D and E (DMAEA.MCQ) showed superior performance compared to the latex and hydrophobic polymers. The polymers of this invention were more efficient and effective.

In Paper Mill No. 1, the ratio of primary:secondary sludge was changed. Normally, the increase in secondary sludge content requires higher polymer dosages for effective flocculation. The results from this testing are shown in Table V.

TABLE V

Paper Mill No. 1, 60:40 Ratio; Primary:Secondary Sludge
Water Drainage (ml) From Polymer Treatment of Sludge

| Equal Actives Dosage ml: Polymer Tested | 2.00 | 3.00 | 5.00 |
|---|---|---|---|
| | | Water Drainage (ml) | |
| Std2 | 88.00 | 115.00 | 120.00 |
| C (DMAEA.BCQ) | 83.00 | 110.00 | 113.00 |
| M (DMAEA.MCQ) | 68.00 | 105.00 | 116.00 |
| Std3 | 80.00 | 105.00 | 110.00 |
| D (DMAEA.MCQ) | 70.00 | 108.00 | 118.00 |
| Q (DMAEA.BCQ) | 60.00 | 90.00 | 110.00 |

In this testing, the hydrophilic polymer C was as efficient and effective as the latex polymers and more efficient and about as effective as the hydrophobic dispersion polymers. Polymer D was more efficient and effective than the hydrophobic dispersion polymer Q.

In Municipal Plant No. 1, the medium to high cationic charge polymers were tested. The results are shown in Table VI.

TABLE VI

Municipal Plant No. 1, 100% Aerobic Digested Sludge
Water Drainage (ml) From Polymer Treatment of sludge

| Equal Actives Dosage(ml) PolymerTested | 4.00 | 5.00 | 6.00 | 7.00 | 8.00 |
|---|---|---|---|---|---|
| | | | Water Drainage (ml) | | |
| Std4 | | 70.00 | 82.00 | 88.00 | 100.66 | 102.00 |
| F | | 80.00 | 92.00 | 104.00 | 110.00 | |
| G | | 72.00 | 82.00 | 88.00 | 92.00 | |
| H | | 72.00 | 83.00 | 88.00 | 92.00 | |
| Std5 | | 82.00 | 94.00 | 98.00 | 104.00 | 107.00 |
| I | | 82.00 | 94.00 | 96.00 | 102.00 | |
| J | | 85.00 | 90.00 | 95.00 | 102.00 | |

The polymers tested showed performances essentially equivalent to the inverse latex polymers. Differences in performance can be attributed to polymer physical characteristics such as RSV.

Municipal Plant No. 2, treats 100 percent anaerobic digested sludge which is typically more difficult to effectively condition. The test results are shown in Table VII. In this testing, the hydrophilic dispersion polymers of this invention showed equivalent or better activity compared to the equivalent inverse latex polymer.

TABLE VII

Municipal Plant No. 2, 100% Anaerobic Digested Sludge
Water Drainage (ml) From Polymer Treatment of Sludge

| Equal Actives Dosage(ml): PolymerTested | 7.00 | 8.00 | 9.00 | 10.00 | 11.00 |
|---|---|---|---|---|---|
| | | | Water Drainage (ml) | | |
| Std4 | 56.00 | | 76.00 | 95.00 | 115.00 |
| F | 75.00 | 84.00 | 100.00 | 108.00 | 115.00 |
| G | 68.00 | | 90.00 | 100.00 | 105.00 |
| H | 64.00 | | 92.00 | 103.00 | 112.00 |
| Std5 | 70.00 | 78.00 | 96.00 | 110.00 | 110.00 |
| I | 86.00 | | 100.00 | 104.00 | 110.00 |
| J | 84.00 | 90.00 | 102.00 | 104.00 | 106.00 |

Changes can be made in the composition, operation and arrangement of the method of the present invention described herein without departing from the concept and scope of the invention as defined in the following claims:

We claim:

1. A method for dewatering sludge comprising the steps of:
    adding to said sludge an effective dewatering amount of a hydrophilic dispersion copolymer to flocculate the sludge, the hydrophilic dispersion copolymer is formed by free radical polymerization of monomers of acrylamide and a cationic monomer selected from the group consisting of dimethylaminoethylacrylate methyl chloride quaternary salt, dimethylaminoethylmethacrylate methyl chloride quaternary salt, and diallyldimethyl ammonium chloride, the polymerization performed in an aqueous salt solution in the presence of:
    i) a dispersant polymer,
    ii) a chain transfer agent and
    iii) a free radical initiator
    wherein said copolymer has from about 0.25 mole percent cationic charge to about 99 mole percent cationic charge and contains no hydrophobic moieties, and
    removing the flocculated sludge from water.

2. The method of claim 1 wherein said sludge is selected from the group consisting of paper mill sludges and municipal sludges.

3. The method of claim 1 wherein said hydrophilic dispersion copolymer is produced by a batch or a semi-batch process.

4. The method of claim 1 wherein said aqueous salt solution is formed from a polyvalent anionic salt in water wherein said polyvalent anionic salt is selected from the group consisting of phosphates, sulfates and mixtures thereof.

5. The method of claim 1 wherein the dispersant polymer is a water-soluble cationic polymer selected from the group consisting of: poly((meth)acrylamide/dimethylaminoethylacrylate methyl chloride quaternary salt), poly((meth)acrylamide/dimethylaminoethylmethacrylate methyl chloride quaternary salt), poly((meth)acrylamide/diallyldimethyl ammonium chloride), poly(diallyldimethyl ammonium chloride), poly(dimethylaminoethylmeth- acrylate methyl chloride quaternary salt) and poly (dimethylaminoethylacrylate methyl chloride quaternary salt).

6. A method for clarifying water comprising the steps of:
adding to said water an effective clarifying amount of a hydrophilic dispersion copolymer to form a floc, the hydrophilic dispersion copolymer formed by free radical polymerization of monomers of acrylamide and a cationic monomer selected from the group consisting of dimethylaminoethylacrylate methyl chloride quaternary salt, dimethylaminoethylmethacrylate methyl chloride quaternary salt, and diallyldimethyl ammonium chloride, the polymerization performed in an aqueous salt solution in the presence of:
  i) a dispersant polymer,
  ii) a chain transfer agent and
  iii) a free radical initiator
wherein said copolymer has from about 0.25 mole percent cationic charge to about 99 mole percent cationic charge and contains no hydrophobic moieties, and
removing the floc from water.

7. The method of claim 6 wherein said hydrophilic dispersion copolymer is produced by a batch or a semi-batch process.

8. The method of claim 6 wherein said aqueous salt solution is formed from a polyvalent anionic salt in water wherein said polyvalent anionic salt is selected from the group consisting of phosphates, sulfates and mixtures thereof.

9. The method of claim 6 wherein the dispersant polymer is a water-soluble cationic polymer selected from the group consisting of: poly((meth)acrylamide/dimethylaminoethylacrylate methyl chloride quaternary salt), poly((meth)acrylamide/dimethylaminoethylmethacrylate methyl chloride quaternary salt), poly((meth)acrylamide/diallyldimethyl ammonium chloride), poly(diallyldimethyl ammonium chloride), poly(dimethylaminoethylmethacrylate methyl chloride quaternary salt) and poly(dimethylaminoethylacrylate methyl chloride quaternary salt).

10. The method of claim 6 wherein said water is selected from the group consisting of raw water and waste water.

* * * * *